Oct. 28, 1958    R. E. CRONIN    2,857,856
MATERIAL HANDLING APPARATUS
Filed July 24, 1957    2 Sheets-Sheet 1
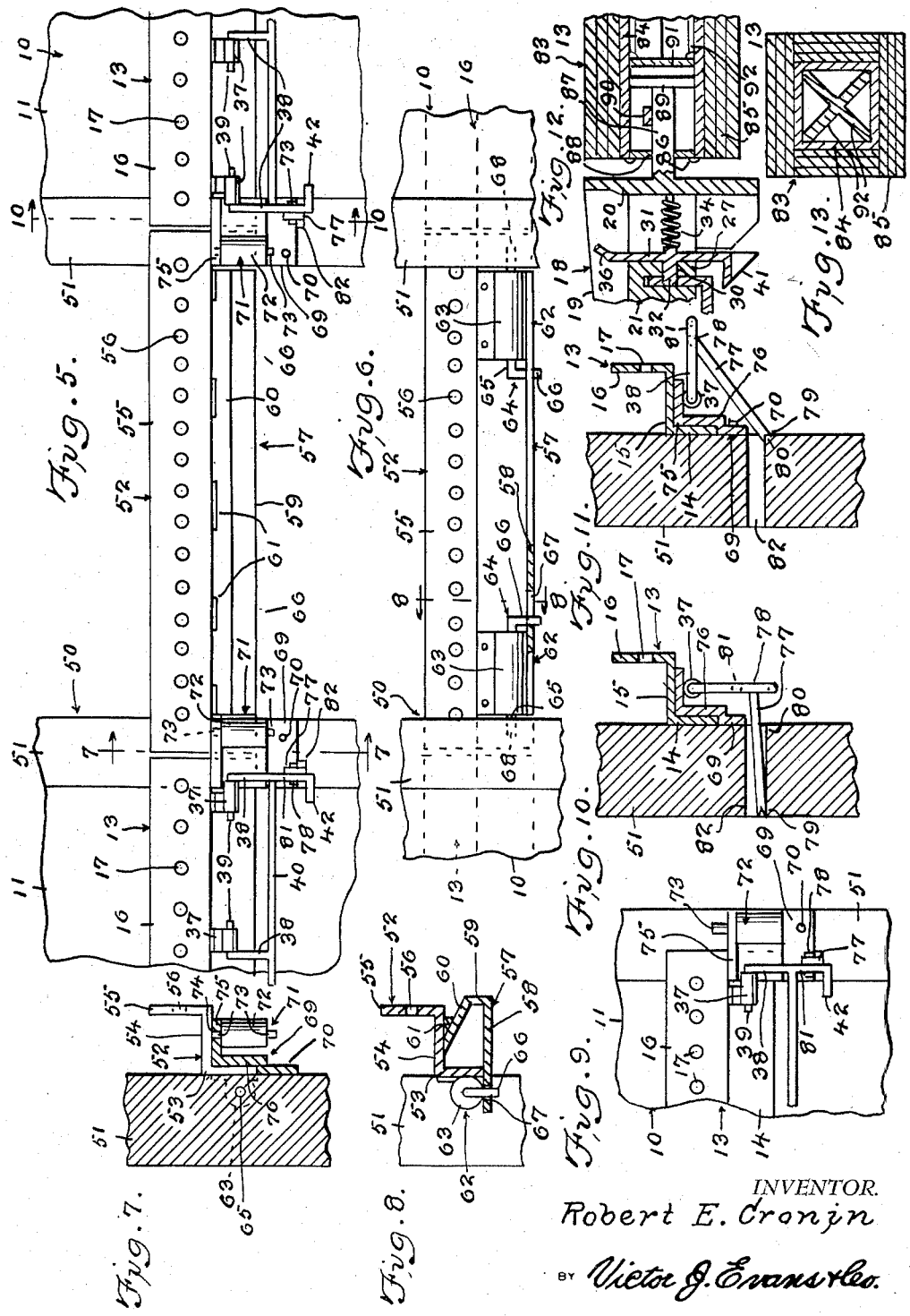
INVENTOR.
Robert E. Cronin
BY Victor J. Evans & Co.
ATTORNEYS

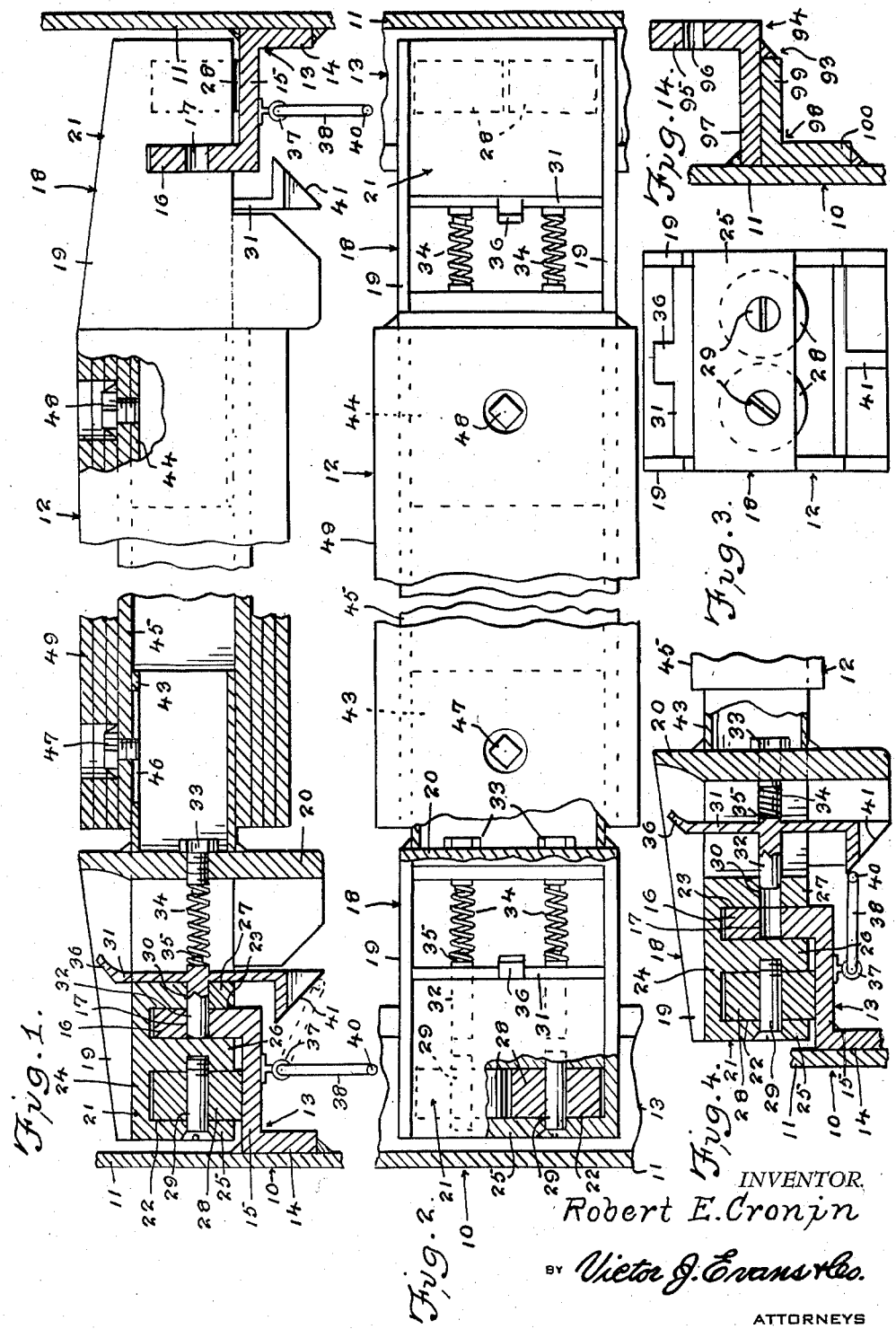

United States Patent Office 2,857,856
Patented Oct. 28, 1958

2,857,856

MATERIAL HANDLING APPARATUS

Robert E. Cronin, Garden City, Mich.

Application July 24, 1957, Serial No. 673,950

2 Claims. (Cl. 105—369)

This invention relates to a material handling apparatus.

The object of the invention is to provide an apparatus for use in a member to be loaded such as a freight car, or the like, whereby loads can be readily fastened or maintained in their proper position.

Another object of the invention is to provide a material handling apparatus which includes cross members that are adapted to be movably mounted in a freight car or the like, so that loads which are being transported can be readily fastened or secured to the cross members so as to prevent accidental shifting or movement of the loads.

A still further object of the invention is to provide cross members for use in a freight car, boat, airplane or other member which is being used for transporting loads, and wherein there is provided a means for movably supporting the cross members so that the cross members can be shifted to different positions as desired.

A further object of the invention is to provide a material handling apparatus which is extremely simple and inexpensive to manufacture.

Other objects and advantages will be apparent during the course of the following description.

In the accompanying drawings, forming a part of this application, and in which like numerals are used to designate like parts throughout the same.

Figure 1 is a side elevational view illustrating one of the cross members of the present invention, and with parts broken away and in section.

Figure 2 is a top plan view of the assembly shown in Figure 1.

Figure 3 is an end elevational view showing one of the cross members.

Figure 4 is a fragmentary sectional view similar to Figure 1, but showing the latch pin in retracted position, as when the cross members are being adjusted or shifted.

Figure 5 is a fragmentary elevational view showing the apparatus which is used in conjunction with the doorway opening of the freight car or the like.

Figure 6 is a view similar to Figure 5, but looking at the opposite side thereof, and with parts broken away and in section.

Figure 7 is a sectional view taken on the line 7—7 of Figure 5.

Figure 8 is a sectional view taken on the line 8—8 of Figure 6.

Figure 9 is a fragmentary elevational view showing the latch for preventing movement of the cross members, as for example when the track which extends across the doorway opening is removed.

Figure 10 is a sectional view taken on the line 10—10 of Figure 5.

Figure 11 is a view similar to Figure 10 but showing the parts in adjusted position.

Figure 12 is a fragmentary sectional view illustrating a modification.

Figure 13 is a sectional view taken on the line 13—13 of Figure 12.

Figure 14 is a fragmentary sectional view illustrating a modified rail.

Referring in detail to the drawings, the numeral 10 indicates a portion of a hollow member which may be a freight car or the like, and the member 10 includes the usual vertically disposed side walls 11, Figure 1. The present invention is directed to a crossbar assembly which is indicated generally by the numeral 12, and the crossbar assembly 12 is adapted to be used for having cables, ropes or the like arranged in engagement therewith, whereby loads which are being transported in the freight car or other member 10 can be securely anchored or maintained in place.

The freight car 10 has rails 13 secured therein, and the rails 13 are arranged adjacent the inner surface of each side wall 11 and secured thereto. Each of the rails 13 is horizontally disposed, and each rail 13 has a substantially Z-shape. Each rail 13 embodies a first vertically disposed portion 14 which is secured to the side wall 11 in any suitable manner, as for example by welding. Extending inwardly from the upper edge of each first portion 14 is a horizontally disposed second portion 15 which terminates in an upstanding third portion 16. The portion 16 of the rail 13 is provided with a plurality of spaced apart openings 17 for a purpose to be later described. Mounted on each end of the crossbar assembly 12 is a head which is indicated generally by the numeral 18.

As shown in Figures 1, 2 and 4 for example, it will be seen that each head 18 includes a pair of spaced parallel vertically disposed side sections 19, and a web 20 extends between the side sections 19 and is secured thereto or formed integral therewith. The head 18 further includes a base 21 which is provided with a first and second spaced parallel recess 22 and 23, and the base 21 further includes a top portion 24. The recesses 22 and 23 define in the base 21 lips 25, 26, and 27 for a purpose to be later described.

Rollers 28 are positioned in the recess 22, and the rollers 28 are journaled on securing elements or pins 29, the securing elements 29 extending from the lip 25 into engagement with the lip 26. The rollers 28 are adapted to engage the portion 15 of the rail 13 whereby the crossbar assembly 12 can be readily moved along the rails 13 so that the crossbar assemblies can be positioned at any desired location in the freight car or other member in which they are mounted.

Each head 18 further includes a movable plate 31, and the plate 31 can be moved from the position shown in Figure 1 to the position shown in Figure 4 since the plate 31 is movably mounted between the lip 27 and web 20. A pair of spaced parallel fingers 32 extend from the plate 31 and the fingers 32 are secured to the plate 31 or formed integral therewith. The fingers 32 are mounted for movement into and out of engagement with a pair of apertures 30 which are formed in the lip 27, and these fingers 32 are also adapted to engage the openings 17 in the portion 16 of the rail 13.

Extending through the web 20 is a pair of screw members 33, and coil springs 34 each have an end engaging the screw members 33, while the other ends of the coil springs 34 are arranged in engagement with projections 35 which extend rearwardly from the fingers 32 whereby the coil springs 34 will serve to normally urge or bias the parts into the position shown in Figure 1.

The numeral 36 indicates a finger engaging portion which is arranged on the upper end of the plate 31 whereby the parts can be manually moved from the position shown in Figure 1 to the position shown in Figure 4 by applying pressure to the portion 36, and with the parts in the position of Figure 4, the crossbar assembly 12 can be readily shifted or moved along the rails 13 to the desired location.

The numeral 41 designates an inclined finger on the lower end of the movable plate 31, for a purpose to be later described. There is further provided sleeves 37 which are mounted below the second portion 15 of the rail 13. Arms 38 have transverse portions 39 journaled in the sleeves 37, and a rod 40 extends between the arms 38 and is secured thereto, the rod 40 adapted to engage the inclined portions or fingers 41 whereby the plates 31 can be readily moved from the position shown in Figure 1 to the position shown in Figure 4 when desired. The portion 36 can be manually gripped when a single plate 31 is to be moved to the position shown in Figure 4, but when all of the plates of all of the crossbar assemblies are to be simultaneously moved or actuated, then the rod 40 can be moved and the elongated rod 40 will engage all of the inclined fingers 41 to thus move the plates. For moving the rod 40, a hand grip portion 42 extends from one of the arms 38, Figure 5, so that by gripping the portion 42, the transverse portions 39 will pivot in the sleeves 37 whereby the rod 40 can swing outwardly and engage the inclined fingers 41 to thereby move the plates 31 and thus move the fingers 32 out of the registering openings 30 and 17.

The crossbar assembly 12 further includes a pair of opposed tubes 43 and 44. Thus, one of the tubes 43 extends from one of the webs 20 of each head 18 and is secured thereto as by welding, and extending between the pair of tubes 43 and 44 is a support member 45. The tube 43 is provided with a slot 46, and a securing element 47 extends through the support member 45 and it is secured thereto as by welding, the securing element 47 projecting into the slot 46. A second securing element 48 is secured as by welding to the other end of the support member 45, and the securing element 48 extends into an aperture or opening in the tube 44. Due to the provision of the slot 46, it will be seen that the effective length of the crossbar assembly 12 can be changed so as to compensate for freight cars of different widths or sizes. A plurality of body pieces 49 surround the support member 45 and are secured thereto in any suitable manner. The support member 45 may be made of a suitable material such as metal, while the body pieces 49 may be made of wood, and this construction insures that the center of the crossbar assembly 12 will be properly reinforced by the steel support member 45.

In Figures 5 and 6, the numeral 50 indicates a doorway opening which is arranged in the freight car, and arranged adjacent the doorway opening 50 are vertically disposed posts 51. Extending across the doorway opening 50 is a horizontally disposed track 52 which has a substantially Z-shape, Figure 8. Thus, the track 52 includes a vertically disposed first portion 53, a horizontally disposed second portion 54, and an upstanding third portion 55 which is provided with a plurality of openings 56 therein. Positioned below the track 52 and secured to the track 52 is a bar 57, and the bar 57 includes a horizontally disposed first section 58, and an upstanding second section 59 which terminates in an inclined third section 60. The section 60 of the bar 57 is secured as by welding as at 61 to the track 52. Due to the provision of the track 52, it will be seen that when the track is in the position shown in Figures 5 and 6, the crossbar assembly 12 can be rolled from one end of the freight car to the other so that the crossbar assembly does not have to stop at the doorway opening 60.

There is further provided latches 62 for releasably connecting the track 52 and bar 57 in the positions shown in Figures 5 and 6. Each latch 62 includes a casing 63 which has a keeper 64 movably connected thereto, and each keeper 64 includes a first portion 65 and a transverse portion 66, the portion 66 extending through a slot or cutout 67 in the bar 57. The end of the keeper 64 is adapted to engage in or register with an opening 68 in the post 51. By manually gripping the portion 65, the keeper 64 can be moved so that the portion 65 can be moved out of engagement with the opening 68 whereby the track 52 and bar 57 can be removed from the doorway opening 50 as desired.

There is further provided a means for preventing the crossbar assembly 12 from rolling or moving past the ends of the rails 13, when the track 52 is removed from the doorway opening 50. This last named means comprises a bracket 69 which is secured to the posts 51 by suitable securing elements 70, Figure 7. There is further provided stop members which are indicated generally by the numeral 71, and each stop member 71 includes a housing 72 which depends from the portion 75 of the bracket 69, and is secured thereto. A stop pin 73 is movably or vertically adjustable in the housing 72, and the pin 73 is mounted for movement through an opening 74 in the top portion 75 of the bracket 69. Thus, when the track 52 is removed, the pin 73 is urged upwardly by a suitable spring arrangement in the housing 72, so that this pin 73 will lock any movement of the crossbar assembly 12 beyond the end of the rail 13, as for example when the track 52 is not in place across the doorway opening 50. The brackets 69 are provided with offset vertically disposed portions 76 which provide seats for the ends of the tracks 52 whereby the tracks 52 are releasably held in place.

Projecting from certain of the arms 38 are extensions 81, and the extensions 81 have the hand gripping portions 42 connected thereto. A link 77 is pivotally connected to the extension 81 through the medium of a pivot pin 78, and the link 77 is adapted to engage a suitable cutout 82 in the post 51, Figures 10 and 11. The link 77 is provided with a recess 79 which can be arranged in engagement with a shoulder 80 adjacent the opening 82, as for example as shown in Figure 11.

Referring to Figures 12 and 13 of the drawings, there is shown a modified crossbar assembly which is indicated generally by the numeral 83. The crossbar assembly 83 includes a support member 84 which has a plurality of body pieces 85 arranged thereover. The numeral 86 designates an end piece which is secured to the support member 84, and a shank 87 extends from the web 20 of the head 18 and is secured thereto, the shank 87 extending through an opening 88 in the end piece 86. A plate 89 is secured to the inner end of the shank 87, and a stop member 90 is provided for limiting movement of the plate 89. There is further provided a panel 91, and a plurality of braces or reinforcing members 92 are secured to the panel 91, and the braces 92 are arranged in crisscross formation as shown in Fig. 13 for example, whereby the crossbar assembly will have increased rigidity or strength. Otherwise the construction of the crossbar assembly 83 is the same as the previously described unit 12.

In Fig. 14 there is shown a modified rail which is indicated by the numeral 93, and the rail 93 is adapted to be used in lieu of or instead of the rail 13. The rail 93 includes an upper member 94 of substantially L-shape, and the member 94 includes a vertically disposed portion 95 which is provided with a plurality of openings 96, the member 94 further including a horizontal portion 97 which is secured as by welding to the side wall 11 of the freight car. There is further provided an L-shaped lower member 98 which includes a portion 99 that is secured as by welding to the portion 97 of the upper member 84, and the lower member 98 further includes a vertically disposed portion 100 which is secured as by welding to the side wall 11. Thus, the portions 95 and 97 coact with the wall 11 to define a trackway whereby the rollers 28 can readily move therethrough as when the crossbar assemblies are being moved from place to place in the box car or freight car or other unit in which they are installed.

From the foregoing it is apparent that there has been provided an apparatus or mechanism for use in members such as freight cars or box cars wherein loads can be securely anchored or maintained immobile in any desired position. In use, the conventional box car 10 includes the side walls 11, and the rails 13 of Z-shape are secured as by welding to the side walls 11. Then, with the crossbars 12 arranged as shown in Figs. 1, 2 and 4, for example, it will be seen that after the crossbars 12 have been moved to their desired location, cables, ropes or the like can be wrapped or trained around the body pieces 49 and then these cables or ropes can be anchored to boxes, cartons, pieces of machinery or other loads which are being handled or transported. Thus, the load can be securely anchored in place so that such loads will not accidentally shift or move during transit or the like.

The effective length of the crossbar units 12 can be changed as desired since the bolts 47 extend through the slots 46 in the tube 43. This arrangement permits the support member 45 to move in and out on the tube 43 so that the effective length of the crossbar unit 12 can be readily changed or regulated. It is to be noted that there are one of the horizontally disposed rails 13 on each of the side walls 11, and the rails 13 are arranged in opposed relation with respect to each other. Each crossbar unit 12 includes a head 18, and the rollers 28 are journaled in the heads 18 by means of the pins 29. These rollers 28 engage the horizontal portions 15 of the rails 13 so that with the fingers 32 in the retracted position shown in Fig. 4, the crossbar units 12 can be shifted lengthwise through the box car so that these crossbars 12 can be moved to any desired location. After the crossbars 12 have been moved to the desired location, the coil springs 35 will urge the plates 31 towards the lips 27 so that the fingers 32 will extend through the openings 30 in the lips 27 and these fingers 32 will then extend through the registering openings 17 in the upstanding portions 16 of the rails 13 and this will serve to lock the crossbars 12 immobile in their adjusted position.

When it is desired to shift the crossbar unit 12 along the rails 13, the plates 31 can be moved from the position shown in Fig. 1 to the position shown in Fig. 4 by placing manual pressure against the portions 36 so that the coil springs 34 will be depressed and wherein the fingers 32 will be moved out of the openings 17 so that the cross bars 12 are free to roll on the rollers 28 to the desired location. Instead of applying manual pressure on the portions 36, the hand grips 42 can be actuated and by moving the hand grip 42 outwardly from its normal vertical position, it will be seen that the rod 40 will swing upwardly to the dotted line position shown in Fig. 1 whereby the rod 40 will engage the inclined surface 41 on the lower end of the plate 31 and this will also cause the plate 31 to move outwardly from the position shown in Fig. 1 to the position shown in Fig. 4. The member 42 can be actuated when a plurality of the plates 31 on different crossbars 12 are to be actuated at the same time whereas when only one plate 31 is to be moved, then the portion 36 can be engaged.

The parts can be made of any suitable material and in different shapes or sizes. The body pieces 49 may be made of wood, plastic or the like, and the support member 45 may be made of steel so that the members which have the load supporting cables connected thereto are sufficiently strengthened. The bolt 48 extends into a suitable opening in the tube 44, while the bolt 47 extends into the slot 46 of the tube 43 and this arrangement serves for the purpose previously described, namely, to permit a means for adjustment of the length of the crossbar as for example in order to compensate for varying widths of freight cars or box cars, boats, airplanes or the like.

Furthermore, due to the provision of the tracks 52, it will be seen that the tracks 52 provide an extension for the rails 13 so that for example as shown in Figs. 5 and 6, the crossbar unit 12 can be rolled or moved from one end of the railway freight car to the other so that the doorway opening 50 will not interfere with movements of the crossbar unit. Thus, the tracks 52 are arranged in alignment with the rails 13 so that with the tracks 52 in place, it will be seen that the pins 73 will be moved downwardly from the position shown in Fig. 9 to the position shown in Fig. 7 whereby the rollers or wheels 28 of the crossbar unit can readily roll along the portion 15 of the rails 13 and then these rollers can roll along the portion 54 of the tracks 52 so that the load can be anchored at any desired location in the box car. By removing the track 52, the doorway opening 50 is left clear so that there is no interference with loading or unloading of the box car. In order to remove the track 52, it is only necessary to manually engage the portion 66 of the keeper 64 whereby the pin 65 will be disengaged from the opening 68 in the post 51 and this will permit the unitary track 52 and bar 57 to be removed from engagement with the bracket 69. The brackets 69 are secured to the posts 51 as by means of the securing elements 70, and as soon as the track 52 is lifted or removed from engagement with the brackets 69, the pin 73 will move upwardly through the opening 74 from the position shown in Fig. 7 to the position shown in Fig. 9. Thus, the pin 73 will act as a stop member so that when the track 52 is not extending across the doorway opening 50, the rollers 28 will engage the upstanding stop pin 73 so as to limit or prevent movement of the crossbar unit past the doorway opening 50. Thus, the crossbar units will not accidentally fall off of the rails 13. The tracks 52 are provided with the plurality of openings 56 which serve the same purpose as the previously described openings 17, namely, the openings 56 provide a means whereby the fingers 32 can extend therethrough whereby the crossbar units 12 can be held immobile even when the crossbar units are in registry with the tracks 52.

In Figs. 10 and 11, there is shown link 77 which can be moved out of engagement with opening 82 in the doorpost 51 so that the notch 79 in the link 77 can be arranged in engagement with the shoulder 80 of the doorpost 51, as for example as shown in Fig. 11 whereby the parts including the rod 40 will be maintained in a raised or horizontal position so that the inclined surface 41 will be engaged whereby the plates 31 will be kept in the position of Fig. 4 so that all of the crossbar units can be simultaneously shifted to any desired location without the necessity of manually moving each plate 31 individually.

In Figs. 12 and 13 there is shown a modified crossbar unit 83 wherein instead of using a tube such as the tube 43, a shank or stem 87 extends from the web 20 into the support member 84. The support member 84 is provided with a plurality of braces 92 therein which are arranged in crisscross fashion as shown in Fig. 13, and this arrangement serves to further strengthen the assembly so that heavier loads can be handled or supported. Otherwise, the function and construction of the assembly 83 is the same as previously described.

In Fig. 14 there is shown a modified Z-rail 93 which is made of a pair of L-shaped members 94 and 98 which are welded as previously described, and the portions 95, 97 and 11 coact to define a raceway or trackway whereby the rollers 28 can readily move or roll therealong so that the crossbar units can be readily positioned at any desired location.

As previously described, the X-shape members 92 serve to increase the strength of the crossbar. In Fig. 14 there is illustrated a means for converting L-shaped rails into rails which can be used with the crossbars of the present invention. In Figs. 12 and 13 the plates 89 move as the shank 87 moves, and the member 90 serves as a stop member to limit movement of the parts. It will be seen that the arrangement of the bolt 47 which extends into the slot 46 provides a telescoping arrangement whereby the effective length of the device can be automatically or easily changed. The body pieces 49 can be secured to the support member 45 in any suitable manner, as for example by means of a suitable adhesive. As previously described, the doorway bars 57 and tracks 52 provide a means whereby the crossbars 12 can readily cross beyond the doorway opening 50. The apparatus of the present invention can be easily rolled or moved to the desired location, and the apparatus will facilitate the fastening of loads in place in box cars or the like. Each head 18 is provided with two of the rollers 28. The pins 73 serves as safety stop members at the door openings 50 of the freight cars so as to prevent the crossbars from rolling off the ends of the rails 13 when the tracks 52 and bars 57 are removed. The tracks 52 and bars 57 can be readily removed by withdrawing the pins 65 from the openings 68 as previously described. The rod 40 is adapted to engage the inclined surfaces 41 so that the plates 31 can be readily moved as previously described. After the cargo has been arranged in the desired position, the crossbars are held immobile, and if desired, suitable spacer members can be used in conjunction with the crossbars for properly holding the parts in the proper position.

By means of the present invention, one person can readily move the parts and operate the mechanism and the apparatus is more easy to use than previous or existing types of apparatus. The lock pins or fingers 32 can be held back in the position shown in Fig. 4 until the crossbar 12 is in the desired position. When the notch 79 in the link 77 is in the position shown in Fig. 11, the plate 31 will be kept in retracted position so that all of the crossbars 12 can be readily moved along the rails. The screw members or bolts 33 can be adjusted in order to regulate tension on the coil springs 34. With the present invention, heavy bulky cargoes, such as automobile bodies, can be tied to the crossbars and then moved back into the car for loading or else they can be pulled forward for unloading and this is possible due to the provision of the rollers 28 which roll along the rails 13 and tracks 52. The parts may be made of light weight material as for example when the apparatus is being used in truck trailers, cargo planes or the like and in certain instances instead of welding the parts, rivets can be used for securing the parts in place.

While I have shown a preferred form of my invention, I reserve all rights to such modifications as properly fall within the scope of the invention as claimed.

I claim:

1. In a material handling apparatus, a hollow member including vertically disposed side walls, at least one of said side walls being provided with a doorway opening therein, a horizontally disposed rail secured to the inner surface of each of said side walls and each of said rails having a substantially Z-shape, each of said rails embodying a vertically disposed first portion secured to said side wall, a horizontally disposed second portion extending inwardly from said first portion, a vertically disposed third portion extending upwardly from said second portion, there being a plurality of spaced apart openings in the third portion of said rail, horizontally disposed crossbars extending between said rails and movably supported thereby, each of said crossbars comprising a head on each end thereof, each of said heads including a pair of spaced parallel vertically disposed side sections, a web extending between said pair of side sections and secured thereto, a base arranged between and connected at its opposite ends to said side sections and said base being provided with first and second spaced parallel recesses defining first, second and third lips in said base, a pair of rollers journaled in said first recess and adapted to engage the second portion of the rail, securing elements extending inwardly from said first lip and into said second lip and said securing elements having said rollers journaled thereon, there being a pair of spaced apart apertures in said third lip, a plate movably mounted between said web and third lip, a pair of spaced parallel fingers formed integral with and extending outwardly from said plate and mounted for movement into and out of the apertures in said third lip and into and out of the openings in the third portion of the rail, screw members adjustably mounted in said web, coil springs extending between said screw members and said fingers, a hand engageable portion on the upper end of said plate, an inclined surface on the lower end of said plate, sleeves mounted below the second portion of said rail, arms having transverse portions journaled in said sleeves, a rod extending between said arms and secured thereto and said rod being mounted for movement into and out of engagement with the inclined surfaces on the bottom of the plate, and hand grip portions extending from one of said arms, a tube extending inwardly from each of the webs of said head, one of said tubes being provided with a slot therein, a support member extending between said pair of tubes and mounted thereon, securing elements extending through said support member and engaging said tubes, one of said last named securing elements engaging the slot in said one tube, and body pieces mounted on said support member.

2. In a material handling apparatus, a hollow member including vertically disposed side walls, at least one of said side walls being provided with a doorway opening therein, a horizontally disposed rail secured to the inner surface of each of said side walls and each of said rails having a substantially Z-shape, each of said rails embodying a vertically disposed first portion secured to said side wall, a horizontally disposed second portion extending inwardly from said first portion, a vertically disposed third portion extending upwardly from said second portion, there being a plurality of spaced apart openings in the third portion of said rail, horizontally disposed crossbars extending between said rails and movably supported thereby, each of said crossbars comprising a head on each end thereof, each of said heads including a pair of spaced parallel vertically disposed side sections, a web extending between said pair of side sections and secured thereto, a base arranged between and connected at its opposite ends to said side sections and said base being provided with first and second spaced parallel recesses defining first, second and third lips in said base, a pair of rollers journaled in said first recess and adapted to engage the second portion of the rail, securing elements extending inwardly from said first lip and into said second lip and said securing elements having said rollers journaled thereon, there being a pair of spaced apart apertures in said third lip, a plate movably mounted between said web and third lip, a pair of spaced parallel fingers formed integral with and extending outwardly from said plate and mounted for movement into and out of the apertures in said third lip and into and out of the openings in the third portion of the rail, screw members adjustably mounted in said web, coil springs extending between said screw members and said fingers, a hand engageable portion on the upper end of said plate, an inclined surface on the lower end of said plate, sleeves mounted below the second portion of said rail, arms having transverse portions journaled in said sleeves, a rod extending between said arms and secured thereto and said rod being mounted for movement into and out of engagement with the inclined surfaces on the bottom of the plate, hand grip portions extending from one of said arms, a tube extending inwardly from each of the webs of said head, one of said tubes being provided with a slot therein, a support member extending between said pair of tubes and mounted thereon, securing elements extending through said support member and engaging said tubes, one of said last named securing elements engaging the slot in said one tube, body pieces mounted on said support member, vertically disposed posts secured to said side walls adjacent said doorway opening, a Z-shaped track extending between said posts and extending across said doorway opening, said track including a first vertically disposed portion, a horizontally disposed second portion and a vertically disposed third portion, said last named third portion being provided with a plurality of openings therein, a bar arranged below said track and secured thereto, and said bar including a horizontally disposed first section, a vertically disposed second section extending from said first section and terminating in an inclined third section, said third section being secured to the second portion of said track, a latch including a hollow casing, a keeper movably mounted in said casing and including a first portion and a transverse second portion, there being cut-outs in said bar for the slidable projection therethrough of the transverse second portion of said keeper, said post having openings therein for selectively receiving the first portion of said keeper, an L-shaped bracket arranged in engagement with said post, a stop member secured to said bracket and including a housing, a stop pin movably mounted in said housing and a spring mounted in said housing to move said pin upwardly when the track is removed, a link pivotally connected to one of said arms, there being an opening in said post for selective engagement with said link.

References Cited in the file of this patent

UNITED STATES PATENTS

| | | |
|---|---|---|
| 1,970,610 | McMullen et al. | Aug. 21, 1934 |
| 2,468,101 | Nampa | Apr. 26, 1949 |
| 2,519,846 | Nampa | Aug. 22, 1950 |
| 2,725,826 | Tobin et al. | Dec. 6, 1955 |